United States Patent Office 3,424,709
Patented Jan. 28, 1969

3,424,709
STABILIZED POLYPROPYLENE CONTAINING CARBON BLACK AND A THIODICARBOXYLIC ACID ALKYL ESTER
Felix Schülde, Neuenhain, Taunus, and Jakob Winter, Hofheim, Taunus, Germany, assignors, by mesne assignments, to Hercules Incorporated, a corporation of Delaware
No Drawing. Filed May 23, 1960, Ser. No. 30,763
Claims priority, application Germany, May 27, 1959, F 28,534
U.S. Cl. 260—41  2 Claims
Int. Cl. C08f 29/02, 45/58

The present invention relates to stabilized polypropylene containing carbon black.

Various types of carbon black are used for stabilizing polyolefins against light or as pigments for blackening polyolefins. It has, however, been described by W. L. Hawkins et al. in "Journal of Applied Polymer Science," vol. 1, No. 1, pp. 37 to 49, that most of the usual antioxidants partially lose their effectiveness in polyethylene containing carbon black while the addition of thio derivatives to polyethylene containing carbon black leads to a considerably improved protection against oxidation.

Tests for stabilizing polypropylene containing carbon black with appropriate compounds containing sulfur have shown that the aforesaid rule does not apply to polypropylene since the effectiveness of heat stabilizers containing sulfur or free from sulfur is considerably reduced in polypropylene containing carbon black. The degree to which the stabilizing effect is reduced is evident from Table I.

groups contain 3 to 25, preferably 5 to 20, carbon atoms in a straight or branched aliphatic chain.

The thiodicarboxylic acid esters to be used according to the invention considerably increase the heat stability of polypropylene containing 0.01 to 4%, preferably 0.5 to 3%, of carbon black.

As suitable thiodicarboxylic acid esters there are mentioned: thiodipropionic acid lauryl ester, thiodipropionic acid stearyl ester, thiodipropionic acid cetyl ester, thiodibutyric acid octyl ester, thiodibutyric acid-2-methylhexyl ester, thiodivaleric acid isopropyl ester, thiodicaproic acid dodecyl ester and thiodicaprylic acid lauryl ester.

Alternatively, two different carboxylic acid alkyl esters may be linked by sulfur. In special cases, a particularly good stabilizing effect is obtained by using a mixture of different thiodicarboxylic acid alkyl esters.

Even by the use of excessively high processing temperatudes the increase in heat stability is not affected or only very little so. The concentration of thiodicarboxylic acid ester in the polymer necessary for obtaining the desired stabilizing effect amounts to 0.01 to 3.0%, advantageously 0.05 to 1. The stabilizer is admixed in the usual manner. The physical properties of the polymer are not affected by the aforesaid heat stabilizers.

The heat stabilizers may also be used in combination with other known anti-ageing substances. The stabilizing effect is not influenced by the addition of dyestuffs, pigments or fillers.

The following examples serve to illustrate the invention but they are not intended to limit it thereto.

TABLE I

| Heat Stabilizer | Quantity in percent | Addition of carbon black in percent | Stability of injection-moulded sheets in days at— | |
|---|---|---|---|---|
| | | | 120° C. | 140° C. |
| N-stearyl-p-aminophenol | 0.5 | | 300 | 30 |
| | 0.5 | 2 | 75 | 5 |
| Condensation product from acetone and nonylphenol | 0.5 | | 100 | 2–3 |
| | 0.5 | 2 | 20 | 1–2 |
| 4,4'-thio-bis-(6-tertiary butyl-m-cresol) | 0.5 | | 350 | 8 |
| | 0.5 | 2 | 25 | 1–2 |
| β-thionaphthol | 0.5 | | >100 | 10 |
| | 0.5 | 2 | 65 | 3 |
| 4,4'-dinonyl-2,2'-dinaphthylsulfide | 0.5 | | >100 | 10 |
| | 0.5 | 2 | 75 | 5 |
| bis-(octadecylmercapto)-sulfide | 0.5 | | 90 | 11 |
| | 0.5 | 2 | 1 | 1 |

It has therefore not been possible hitherto to obtain a satisfactory heat stability in polypropylene by combining effective known anti-ageing substances with carbon black.

Now we have found that the heat stability of polypropylene containing carbon black can be considerably increased by stabilization with thiodicarboxylic acid alkyl esters. The carboxylic acids in the thiodicarboxylic acid esters to be used in the process of the invention contain 2 to 10, preferably 3 to 6, carbon atoms and the alcoholic

EXAMPLE 1

Polypropylene powder obtained by a low pressure process and having an $\eta$ red value of 6.0, was mixed with the additives indicated in Table II and granulated in known manner with the help of a screw extruder and a cutting device. The granules so obtained were made into test sheets 1 mm. thick on an injection moulding machine at a temperature of the cylinder of 300° C. The test sheets were annealed in a drying cabinet at 120° C. and 140° C. respectively, until they had become brittle. Table II indicates the results ascertained by the annealing tests.

TABLE II

| | Addition of carbon black, percent | | | |
|---|---|---|---|---|
| | 2 | 2 | 2 | 2 |
| Stabilizer, 0.5% | | Thiodipropionic acid lauryl ester. | Thiodipropionic acid stearyl ester. | Thiodipropionic acid cetyl ester. |
| Heat stability in days at— | | | | |
| 120° C | 5 | 75 | >100 | >100 | >100 |
| 140° C | <1 | <1 | 15 | 13 | 17 |

EXAMPLE 2

Low pressure polypropylene of an $\eta$ red value of 8.2 was mixed with the additives indicated in Table III. The mixture was granulated and subsequently made into test sheets 1 mm. thick on an injection moulding machine at a temperature of the cylinder of 300° C. The sheets were annealed in a drying cabinet at 120 and 140° C., respectively, until they had become brittle. Table III indicates the results ascertained by the annealing tests.

TABLE III

| Stabilizer, 0.5% | Addition of carbon black in percent | Stability of injection moulded sheets in days at— | |
|---|---|---|---|
| | | 120° C. | 140° C. |
| Thiodicaprylic acid lauryl ester | | 85 | 7 |
| | 2 | >100 | 14 |
| Thiodivaleric acid isopropyl ester | | 72 | 4 |
| | 2 | >100 | 16 |

We claim:

1. Composition of matter comprising polypropylene containing 0.01 to 4% of carbon black, based on the weight of polypropylene and 0.01 to 3% of a thiodicarboxylic acid dialkyl ester, based on the weight of polypropylene as agents stabilizing against embrittlement by heat, the carboxylic acid moiety of said ester containing 2 to 10 carbon atoms and the alcohol moieties of said ester containing 3 to 25 carbon atoms.

2. A composition comprising solid polypropylene, 0.01%–3% by weight, based on said polypropylene, of a diester of 3,3'-thiodipropionic acid having the formula

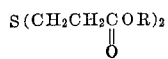

wherein R is an alkyl radical having 4 to 20 carbon atoms and 0.5%–4% of finely divided carbon black.

References Cited
UNITED STATES PATENTS

| | | | |
|---|---|---|---|
| 2,967,846 | 1/1961 | Hawkins et al. | 260—41 |
| 2,967,845 | 1/1961 | Hawkins et al. | 260—41 |
| 2,512,459 | 6/1950 | Hamilton | 260—41 |
| 2,727,879 | 12/1955 | Vincent | 260—41 |
| 2,519,755 | 8/1950 | Gribbens | 260—45.85 |
| 2,925,400 | 2/1960 | Tholstrup et al. | 260—45.85 |

ALLAN LIEBERMAN, *Primary Examiner.*

U.S. Cl. X.R.

260—45.85